GRAPHIC RECORDING APPARATUS

Filed Feb. 10, 1964

2 Sheets-Sheet 1

INVENTOR.
GERALD G. MURPHY
BY Tyler S. Roundy
ATTORNEY

Aug. 30, 1966 G. G. MURPHY 3,270,349
GRAPHIC RECORDING APPARATUS
Filed Feb. 10, 1964 2 Sheets-Sheet 2
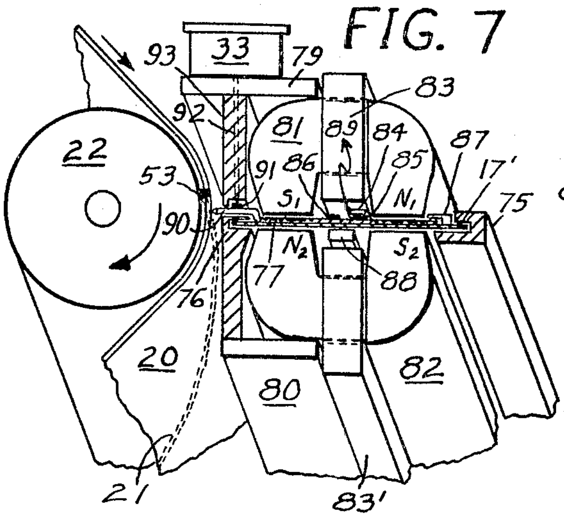
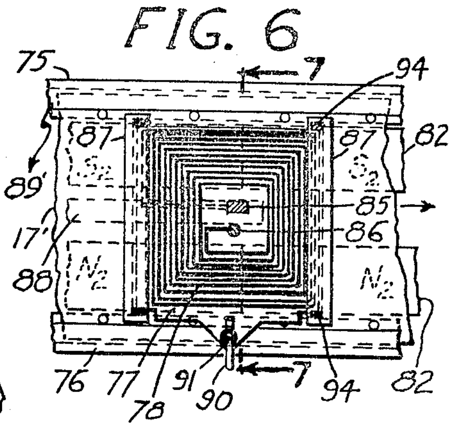
FIG. 8
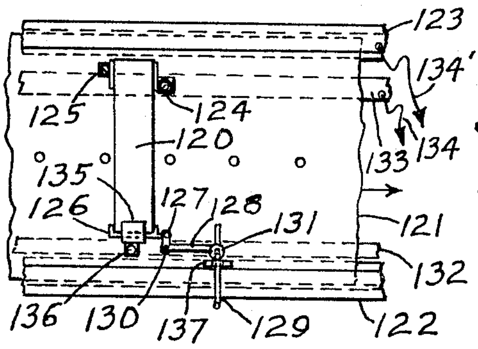
FIG. 9
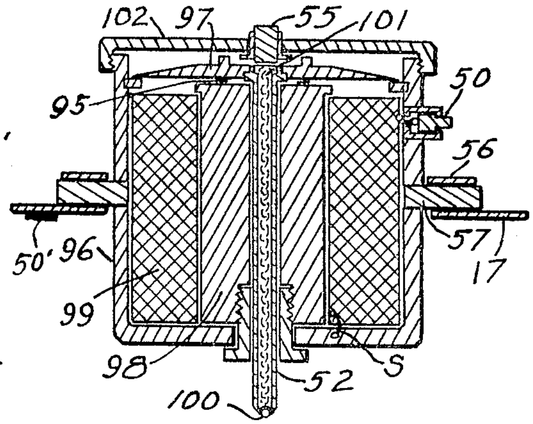
FIG. 11
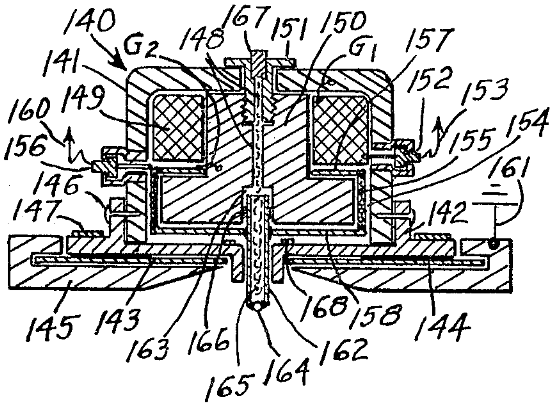
FIG. 10
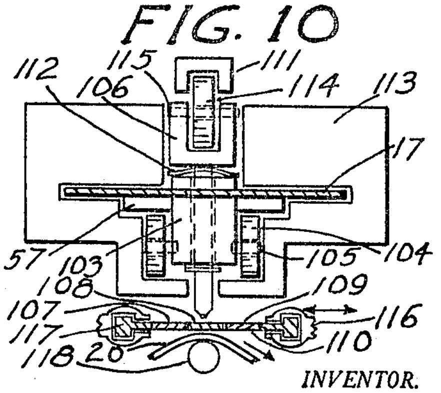
INVENTOR.
GERALD G. MURPHY
BY Tyler S. Roundy
ATTORNEY

United States Patent Office 3,270,349

Patented August 30, 1966

3,270,349

GRAPHIC RECORDING APPARATUS

Gerald G. Murphy, 153 Rock Hill Road, Clifton, N.J.

Filed Feb. 10, 1964, Ser. No. 343,596
10 Claims. (Cl. 346—46)

The present invention relates to graphic recording apparatus intended primarily for accepting and responding to graphic signal impulses which may have been derived from an original subject copy or informational source and for reproducing the resultant informational content in graphic form, such as is accomplished in facsimile apparatus, various writing recorders and the like. It involves a type of recording apparatus capable of being activated by appropriate electrical, mechanical or other type signal impulses and therefrom to effect a graphic recording of corresponding information upon a recording medium in a systematic and predetermined manner. This application is a continuation-in-part of my copending U.S. application Serial No. 816,500, filed May 28, 1959, now U.S. Patent No. 3,121,138.

Heretofore, graphic recording apparatus has been generally of three types. In the ink pen-type recorders, marking has been characterized by the ink stylus remaining substantially in contact with the record sheet while the stylus is moved across the record sheet surface in varying amplitudes of excursion from a reference line or position on the record sheet and while the record sheet is moved uniformly in a substantially orthogonal path to this excursion. Information is considered lost if the pen lifts off the record sheet. In facsimile recorders of either the electrolytic type or the dry coated paper (Teledeltos) type electrode contact is required with the record sheet whereby electrical current is passed into or through the sheet to effect a chemical change with attendant marking effects on an element by element basis. These recording papers must be specially prepared chemically, present certain problems in manufacture and use and are generally expensive. Electrode contact or proximity is maintained uniformly throughout the recording stroke as the recording paper is moved slowly orthogonally to this stroke. Information is obtained by the variation or withholding of current passage into or through the paper in accordance with received graphic information signals.

It is an object of the present invention to provide improved graphic recording apparatus which utilizes very economical recording medium and marking materials.

Another object is to provide means for graphic recording of a so-called continuous type upon a record sheet which may be either opaque, translucent or transparent.

Another object is to provide means for recording on the record sheet which includes a set of signal-activated marking or writing units, each containing a marking element, which are caused to move adjacent to the recording line on the record sheet in an orderly and systematic manner.

Another object is to provide recording means wherein the marking units mark or write with appropriate types of ink, pigment or transferrable film on the record sheet when the marking units are signal-activated.

Another object is to provide a choice of constructions for the marking unit means in view of the speed and definition requirements of the graphic marking to be achieved.

Another object is to provide recording means wherein either monochrome or multi-colored marking may be effected on the record sheet in accordance with signal activation corresponding to respective monochrome type or of multi-colored type of marking signals that may be applied to the graphic recording apparatus.

These and other objects of the invention will be apparent from the description of the apparatus which follows.

The present invention apparatus is applicable to facsimile systems, pen recording instruments and similar graphic recording applications wherein derived information which is converted to electrical, mechanical, hydraulic or other energy transfer form may be applied as an actuating force individually or in predetermined fashion to one or more signal-activated type marking units which are carried in a predetermined manner adjacent to the surface of a recording medium. The recording medium, which is normally of thin sheet material such as writing paper, plastic, fabric or the like, may be moved in a predetermined manner past the normal marking path or recording line on the medium over which range the marking units may be activated to achieve desired graphic results. The recording medium does not require any special coating, impregnation or other chemical treatment and therefore can be very inexpensive.

In graphic recording apparatus heretofore problems have appeared in accomplishing a simple and economical means for so-called continuous recording on ordinary type dry paper and the like, and particularly in achieving economically and immediately a multi-colored reproduction of the subject information at a point removed from that where the original information exists. Difficulties have been encountered in achieving direct ink, pigment or transfer film marking with good and consistent definition at relatively high speed upon a continuous record sheet. Recording media, such as electrolytic paper, dry coated conductive paper and heavy carbon paper, have presented problems of either storage, handling, chemical effects and odors, marking definition, dimensional stability or economy and they have not provided for multi-colored recording of the continuous type in a single apparatus and operating sequence.

The present invention surmounts these difficulties by providing a correlation of operating principles related to the movement of one or more marking elements with respect to the surface of a simple, stable and cheap recording medium while supplying these elements with a respective marking material and while activating their marking function on the recording medium in accordance with applied graphic information signals obtained from a point removed from the recording apparatus. The marking material may also be stable, convenient and very economical.

In the general embodiment of the invention herein, shown relative to facsimile systems, the recording apparatus normally utilizes a so-called continuous record sheet with appropriate carrying and feed means, a set of signal-activated marking or writing units which include marking pens or plungers therein, and a variety of colored inks or pigments or, alternatively, a variety of colors of transfer film, inked ribbon, sheet or the like, supplied respectively to corresponding ones of the marking pens or plungers during appropriate portions of the recording cycle. The record sheet may be transparent, translucent or opaque and may be of various colors according to the end result desired. The marking units are carried periodically past the record sheet and adjacent to the recording line thereon by an endless tape or belt which is driven in a predetermined manner relative to received graphic signals, normally in electrical impulse form, to obtain a correspondence of the graphic recording with the subject copy or original information. The receiving graphic or marking signals which are applied to the recording apparatus are usually produced by an associated scanning apparatus or transmitting device in the system. The marking actuator means, which may be of electromagnetic, mechanical or other design, controls the motions of the marking pens or plungers in accordance with the required picture or intelligence signals, referred to as marking signals, as received. Upon signal acitvation during a recording interval the marking pen or plunger is caused to accelerate and advance into contact either with the recording medium directly, as with ink or fluent marking material, or with a transfer film or sheet therebetween where used, to effect deposit of marking material upon the record medium for the duration of a sustained or forward sense of marking signal. Upon marking signal collapse or reversal the pen or plunger is caused to be retracted from the marking medium or record sheet, as the case may be, by equivalent but oppositely directed force.

The marking pens or plungers are formed for good marking definition and are arranged to provide smooth rolling or sliding contact with the record sheet or marking transfer medium therebetween during the instants of marking. The record sheet, preferably supplied from a long or continuous roll, is fed at a predetermined rate past the path of the marking elements at the recording line, the sheet being maintained with a surface smoothness and yet a marked radius of curvature along this line to aid in achieving excellent marking definition. With multi-colored recording, a different color of ink or of transfer film area is supplied to respective ones of the set of marking pens or plungers, and the marking of each color is to be synchronized with respective color signals received from an associated scanning or transmitting apparatus in the system. The multi-colored recording results may be varied widely by the use of variously colored record materials or areas, prior to the graphic recording process, with either uniform or non-uniform area or pattern of color, in conjunction with a variety of marking material colors to obtain many graphically recorded color combinations. Of course, with single color marking, for example black marking upon a white or light-colored background (record sheet), all marking pens or plungers are supplied with the single black marking material or medium only.

While the drawing illustrates a few possible constructions and combinations of the various elements and means of the present invention, the views are intended to be in no way restrictive of the details of construction or of the possible combinations of these elements and means that may be employed within the scope and spirit of the invention. In the drawing certain details pertaining to signal receiving apparatus and electrical circuits, which may include mechanical, electrical or hydraulic elements and the like, and also certain details of construction such as bearings, shafts, covers, mounting and aligning means and the like, have been omitted since they are believed well understood by those skilled in the art.

The invention, which is clearly capable of further modifications of the specific elements and means disclosed, will be fully understood by reference to the following detailed description in conjunction with the drawing wherein:

FIG. 6 shows details of one type of marking unit with carrying means.

FIG. 7 shows a fragmentary structural assembly employing the marking unit of FIG. 6 where a partial section of FIG. 6 is taken along the line 7—7 thereof.

FIG. 8 shows details of an alternate type of marking unit with carrying means.

FIG. 9 shows in sectional view, taken along the line 9—9 of FIG. 4, constructional details of an electromagnetic type marking unit with ink pen.

FIG. 10 shows in end elevation, details of a mechanically operated marking unit with plunger stylus and transfer ribbon type marking medium.

FIG. 11 shows in sectional view, details of an alternate electromagnetic type marking unit.

Figure 1:
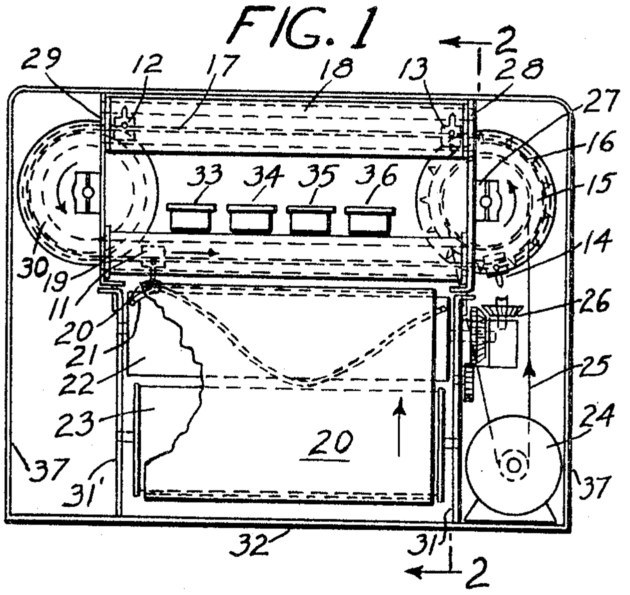
FIG. 1 shows in front elevation, with certain covers removed, a general embodiment of the invention apparatus.
Figure 2:
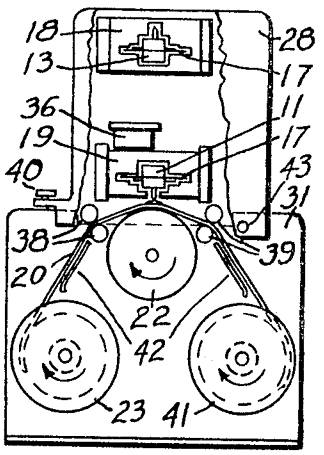
FIG. 2 shows a fragmentary right end view of the assembly of FIG. 1, taken substantially along the line 2—2 thereof.
Figure 3:
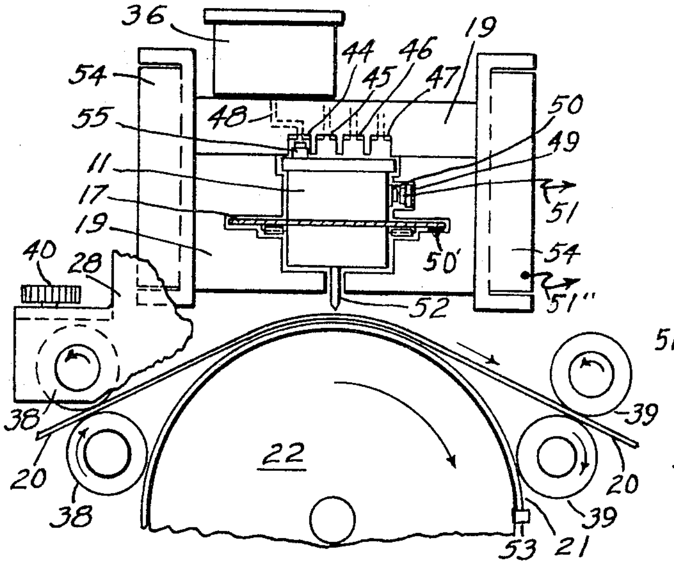
FIG. 3 shows in detail a partial view of FIG. 2.
Figure 4:
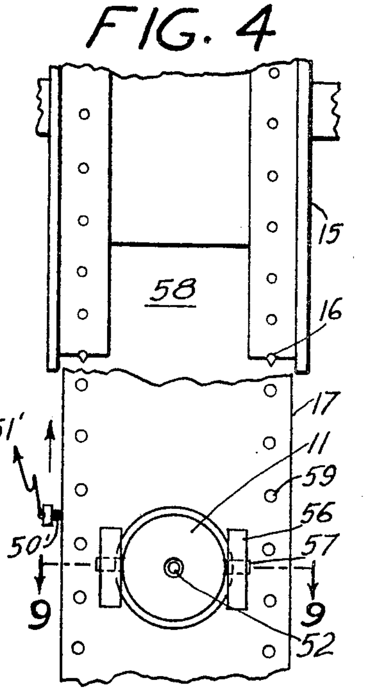
FIG. 4 shows a detail, in plan view, of a possible marking unit, with mounting and carrying means therefor, applicable to the previous figures.

Referring to FIGS. 1, 2, 3, and 4, a set of marking units 11, 12, 13 and 14, each including thereon a marking plunger or pen 52, are mounted at specified intervals along the length of an endless carrying belt or tape 17. Tape 17 passes in endwise translation through channel guides 18 and 19 and around driving pulley 15 as well as around driven or idler pulley 30. Pulley 15 may have sprocket teeth 16, uniformly spaced thereon, or other suitable means, to positively engage and drive tape 17, such as by engaging sprocket holes 59 therein. Pulley 15 is driven, normally at uniform rotational speed, by a primary drive means such as motor 24, connected through a sprocket chain or toothed belt 25, or the like, together with necessary sprocket or pulley wheels, indicated generally, to provide a non-slipping drive therebetween. Bearing blocks 27 mount pulleys 15 and 30 by their respective shaft centers to respectively associated structural mount plates 28 and 29 with suitable provision for alignment and adjustment thereof to obtain proper tension and position for tape 17. Plates 28 and 29 also support guides 18 and 19 by way of mount channels 54 in proper relation to pulleys 15 and 30 to permit tape 17 to readily pass through while carrying the marking units 11, 12, 13 and 14.

Record sheet 20, shown partially cut away to reveal details underneath, is preferably thin and flexible and may be a smooth surface writing paper, plastic sheet, fabric or other material which will accept ink or transfer film marking. Sheet 20 is normally supplied in uniform width and in so-called continuous lengths or rolls on drum 23 from whence it is fed up to and over helix drum 22 past the recording line position thereon. The recording line is a line along the upper surface of sheet 20 as it passes over the top center of drum 22 and which constitutes the momentary marking path of the tip of a marking pen 52 as it maintains substantial contact with sheet 20 for a full marking stroke or interval while its associated marking unit passes through the lower channel guide 19. The record sheet 20 passes from drum 23 over a guide plate 42, between friction or idler rollers 38, over drum 22, between feed or drive rollers 39, over a second guide plate 42 and around the recorded copy take-up drum 41. Drum 41 is employed for convenience in copy take-up and may be omitted from the apparatus, particularly where alternate provision is made to take the completed recording directly from the apparatus immediately following feed rollers 39, such as by a suitable tear-off or cut-off means at this point (not shown).

Drum 22 carries on its cylindrical surface a helical ridge 21 which rises slightly above this surface and extends uniformly in height along the drum in a helical path of substantially uniform pitch for normally an integral number of revolutions about the circumference thereof. Ridge 21 is preferably formed by a small smooth rod or wire of hard material attached firmly along the surface and held such as in end headers 53, but may be effected by machining or otherwise forming the drum surface itself in proper manner to achieve a ridge of equivalent character. Drums 22, 23 and 41 as well as rollers 38 and 39 are mounted by their center shafts in suitable bearings fitted in the apparatus frame end plates 31 and 31'. Rollers 39 are driven in a manner to feed the record sheet 20 past the recording line at a rate corresponding to the graphic information to be produced, such rate being of either a continuous or an intermittent character as may be desired. One each of the pair of pull or feed rollers 39 and the pair of friction rollers 38 may have a resilient outer surface to provide gripping action and adjustment to the thickness and surface condition of the record sheet. A braking means (not shown) is applied to rollers 38 to provide a uniform frictional drag on sheet 20 against the pull of feed rollers 39 thereby maintaining a smooth and preferably taut surface on the sheet at the recording line to enhance marking definition. Alternatively, equivalent braking means may be applied to supply drum 23 and the drag rollers 38 then dispensed with.

Marking units 11, 12, 13 and 14 are normally spaced at substantially an equal distance apart, one to the next, along the full length of tape 17, this spacing being slightly greater than the desired recording line length across sheet 20. Helix drum 22 is rotated by gearing mechanism 26 or other suitable positive drive connection either directly or indirectly linked to the rotation of pulley 15 to maintain a positive and predetermined rotary positional relationship of drum 22 with respect to pulley 15 and therefore also with respect to the endwise translatory position of tape 17. Thus with proper initial indexing of the rotary position of drum 22 with respect to that of pulley 15 such that a portion of the helix ridge 21 is directly adjacent to the tip of a marking unit pen 52 at its nearest approach thereto, with only record sheet 20 passing therebetween, during the respective marking interval of that pen and with the rotary speed of drum 22 properly fixed with respect to that of pulley 15, the successive marking pens 52 will be caused to follow along the surface of the drum 22 substantially parallel to the longitudinal axis thereof and immediately adjacent to ridge 21 during the respective recording intervals of the marking pens. The helix ridge 21 therefore acts to raise the record sheet 20 slightly at the instantaneous marking point, thereby imparting to the sheet a surface curvature convex toward the pen to enhance marking definition. The sheet surface will thus slope sharply away from the instantaneous marking point and thereby restrict further the area of contact of the pen (or plunger) with the record sheet than would otherwise be the case. It will be observed that record sheet 20 should be of relatively thin and flexible material to be suitably deformed partially about the ridge 21 surface at the marking point to achieve this end.

The guides 18 and 19 are formed and aligned to readily permit the passage therethrough of the successive marking units, as they are carried on the tape 17, in a smooth and uniform manner with a minimum of vibration or sideplay to aid in achieving controlled marking conditions. Support channels 54 provide mounting of these guides to the upper frame and plates 28 and 29. Guide 19 is disposed with respect to drum 22 in such manner as to provide passage of the successive marking unit pens adjacent to the recording line on sheet 20 during their recording intervals only, the while maintaining their respective proximities uniform with respect to the recording line. Within guide 19 there is provided an electrical wiper contact strip or commutator strip assembly 49 which is disposed longitudinally therein adjacent to the body of the successive marking units as they pass through the guide. The marking units, which are of electromagnetic type in the present assembly, each carry on one side thereof, in juxtaposition to strip assembly 49 while they pass through guide 19, an electrical contact brush assembly 50 to afford substantially continuous electrical contact with strip assembly 49 during their respective marking intervals only. An electrical connection lead 51 is brought out from the commutator strip 49 for connection to an appropriate signal power driving source associated with the graphic recording apparatus to enable signal activation of the marking units to effect marking. In certain apparatus modifications more than one commutator segment or strip 49 may be provided, with respective leads brought out therefrom, to enable activation from more than one corresponding signal power or driving source. A second or return electrical connection from the marking units to the driving source may be provided by a second contact brush 50′ (FIG. 4) wiping along the side or edge of tape 17, by a second brush and commutator strip oppositely placed (not shown) with respect to strip 49 and brush 50 relative to the marking units and to guide 19, or preferably by a return electrical path through the marking unit body to tape 17 and thence through sliding contact with guide 19, as indicated at 50′ (FIG. 3), since these elements may well be of electrically conductive material, and thence to an outgoing lead 51″. It is understood that brush 50 and commutator strip 49 are electrically insulated from the frame of the apparatus whereas brush or sliding contact 50′, and lead 51′ where used (FIG. 4), may not necessarily be insulated. Thus the marking units 11, 12, 13 and 14 are energized or actuated in uniform succession, one at a time, while they pass successively through guide 19 in proper relation to the recording line. Commutator strip 49 is normally extended through guide 19 for at least the length of the recording line but may be extended otherwise if special recording procedures are desired, such as, for example, alternate connection to more than one driving source during a recording stroke.

Mounted on or adjacent to guide 19 are a set of "containers for pigment" or ink wells 33, 34, 35 and 36, each of which holds and supplies a different colored fluid marking material to respective ones of the set of marking units to provide for multi-colored ink-type recording. In apparatus where only single colored marking is to be performed only one ink well is provided which then supplies the single colored ink required to the complete set of marking units and their associated pens 52. The ink wells feed the ink through corresponding feed ducts 48 to a corresponding set of ink supply recess channels 44, 45, 46 and 47 which are suitably disposed along the interior surface of guide 19 so as to be adjacent to an appropriate surface of the marking units as they pass through the guide. Each marking unit carries an ink pick-up or wiper pad 55 disposed on the marking unit body so as to mate and contact with a particular one only of the supply recess channels and receive the particular colored ink therefrom which then is fed to the marking pen thereon. The supply recess channels may each contain a few small holes or a narrow slit leading into its respective supply duct so as to provide a small ink-wetted surface therein which can contact a supply wiper pad 55 as it passes by. The supply ducts 48 may contain a loose or granulated filler material which provides a capillary action or may be otherwise arranged to provide a limited supply rate of the ink to the corresponding recess channels as may be required by the associated marking pens. The ink supply arrangement to the various marking units may be provided on any portion of their total traverse along their route on tape 17, by similar means to that just described. Each marking pen 52 of the total set is designated to mark in a particular color corresponding to its associated supply recess channel and in accordance with corresponding actuating color signals applied thereto from an associated signal driving source or marking amplifier, the marking signals therefrom being predetermined according to color representation.

With single colored marking it is preferable that the wiper pads and the corresponding single supply recess channel be approximately centered in guide 19 and on the adjacent top surface of the marking unit to aid in marking unit stability during marking. Tape 17 is driven normally at a synchronous rate with respect to the derivation of the graphic information to be reproduced, such derivation being accomplished, for example, in an associated scanning or time-sequential sensing apparatus in the system, thereby providing a direct correlation of the recorded graphic information to that of the original. The record sheet advance may provide for recording a full color sequence on each given recording line increment where the sheet is advanced a step or line width only after passage of a full sequence of color marking units over the recording line, particularly where the marking inks are thin and quick-drying but may also effect a suitable color mixing if superimposed. Conversely, the sheet advance may be at a slow steady rate permitting partial overlap in some instances of the successive marking colors corresponding to the respective sweeps of the successive pens over the sheet.

For relatively high speed marking, as in facsimile use, the tips of the marking pens 52 are formed as a fine rounded and smooth type, preferably of a ball point design for ink marking, as shown in later figures, to provide free sliding or rolling contact with the record sheet and thereby determine a consistently fine definition with uniformly narrow width along the recording line. The moving marking elements within the marking units, be they ink pens or pressure plungers, are to be constructed of very light rigid material in order to possess a very small mass and thereby lend themselves to high speed actuation with comparatively small driving means and driving signal power. A typical mass for a marking element 52, together with a directly affixed driving member such as a rigidly supported coil or a magnetic armature, may be of the order of one to two grams. Such small marking element mass will lend itself to relatively high speed operation, whereas an extended magnetically operated pressure bar operating against a stylus that is carried along the recording line, as has been attempted in the past for example, as an alternate means would not provide equivalent operation due to the relatively high mass and variable flexure of critical members.

Marking is effected on the record sheet 20 at the recording line when the tip of a marking element or ink pen 52 is advanced toward the sheet and in contact therewith, with only slight penetration below the sheet surface, whereby the marking fluid or ink is deposited on the sheet, while contact is maintained, along a narrow line commensurate with the area of contact of the tip with the record sheet. Means are provided within the marking unit to limit the advance of the marking element and therefore the penetration into the record sheet so as to prevent disruption or tearing of the record sheet during marking action.

The recording apparatus is mounted on a main base plate 32 which supports the side mount plates 31 and 31′ and the motor 24. A cover 37 encloses the general working unit. The upper or marker-carrying assembly portion, supported on mount plates 28 and 29, swings on a hinge rod 43 which passes through plates 28 and 29 and also through end plates 31 and 31′ thereby permitting the tilting of this upper section away from the lower or record-sheet-carrying section, when drive belt 25 is parted, for easy replacement and loading of the record sheet material into and through its carrying and feed means. Hold-down thumb-screws 40, or similar means, are provided in formed offset portions of the side frame plates to hold the two principal assembly sections together in proper relationship during operation.

As stated previously, pulley 15 contains uniformly spaced sprocket teeth 16 to engage correspondingly spaced sprocket holes 59 on tape 17 to insure positive drive engagement therefor. In addition, a circuferential recess 58 is provided centrally on pulley 15 to permit clear passage around the pulley periphery of the successive marker units 11, 12, 13 and 14, since their respective bodies protrude through the tape. This recess also applies to pulley 30 of FIG. 1 and any other pulleys that may be used in similar manner to pass the tape and marking units thereon. Electromagnetic type marking unit 11 (see FIG. 4) and the other marking units of the set are mounted to tape 17 by means of mount pins 57 which are imbedded endwise in opposite sides of the marking unit body. Pins 57 have a narrow line of fixed mounting contact, by brazing, soldering or the like, crosswise to tape 17 to readily permit flexure of the tape in passing around the pulleys. Attached to pins 57 on the opposite side to their mounting contact line with tape 17 are stabilizer leaves 56 which extend a short distance lengthwise of the tape and are formed to bear on but not be attached to the tape at their ends when the tape and marking unit is moving in substantially a straight path, such as through guide 19. Thus leaves 56 tend to provide stability to the marking units and the marking pens 52 in terms of uniform translatory motion through guide 19 without rocking or vibration during the marking interval. As the marking unit moves with the tape around a pulley where the tape curves in conformity therewith leaves 56 tend to lift free of the tape.

Figure 5:
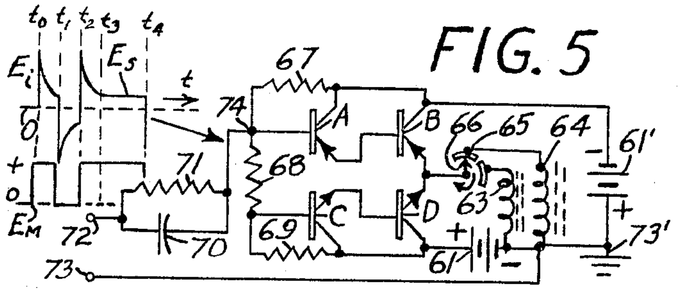
FIG. 5 shows a schematic diagram, with signal graphs, of a signal power driving circuit applicable to activate various types of marking unit in the apparatus.

Referring to FIG. 5, there is shown a schmatic circuit diagram, with typically associated signal graphs, of a marking amplifier that may be employed to advantage as a signal power driving means to actuate various of the electromagnetic type and electrical type marking units disclosed herein. In the circuit four power transistors A, B, C and D, of which the upper two are PNP type and the lower two are NPN type, are connected in a compound complementary symmetry manner with supply battery 61 supplying potential to the lower pair with respect to ground terminal 73′ and with supply battery 61′ supplying potential to the upper pair with respect to ground terminal 73′ and with the polarities indicated. Resistors 67, 68 and 69 are adjusted to provide operating bias to the group of transistors in view of applied signal values and to achieve a balance in the amplifier output power and current direction to be applied to the marking units as a load. Inductor 63 represents the excitation coil or driving coil of an electromagnetic type marking unit and inductor 64 represents the driving coil of a second marking unit of a set or series, such as marking units 11, 12, 13 and 14 previously described. Selector or commutator element 66 selects brush elements or switch segments 65 in succession, each segment being respectively connected to a marking unit driving coil, in a manner similar to the electrical commutation previously described with reference to strip 49 and brushes 50. Thus successive driving coils are selected as a load to the marking amplifier output. The return current path from the driving coils is fixedly made to ground at terminal 73′, which may be a frame ground for the apparatus. The signal input to the amplifier is between the high terminal 72 and ground connection 73. Between input terminal 72 and the driving point to the first amplifier stage, transistors A and C, is connected a pulse-shaping or preemphasis network consisting of resistor 71 and capacitor 70 in shunt to each other.

For full density type marking signals, that is, representative of full black to full white marking excursions only, as indicated at the left of the figure by the input marking signal waveform labeled $E_m$ (the lower waveform pattern), an upward going or positive excursion of signal may be intended to cause marking whereas a collapse or downward going of signal would be intended as no marking. With such input signal, the actual amplifier driving signal at the driving point 74 to transistors A and C will be of the form of the upper waveform labeled $E_1$ at the left of the figure. If the shortest duration of signal impulse required to cause full marking requires an input pulse length of $t_0$ to $t_1$ with an equal off signal time of $t_1$ to $t_2$ to allow return of the marking element then the actual driving signal $E_1$ will provide a peak initial forward drive current to the driving coil for high initial marking element acceleration with a quick exponential decay to a much lower value of acceleration or thrust as the element engages the record sheet or recording medium. Thus the speed of operation of the electromagnetic type of marking units disclosed herein may be enhanced considerably with less average driving power applied than otherwise. If the marking pulse is sustained for a longer period, as from time $t_2$ to $t_4$ in the waveforms shown, the actual driving signal and corresponding amplifier output power will reach an initial peak value immediately following time $t_2$ and decay rapidly to a much lower steady value labeled $E_s$ at the time $t_3$ which value it will then sustain until time $t_4$. The lower average driving power thus applied to the marking units will permit design thereof for much higher operating speed with a given dissipation rating for the units.

This type of marking amplifier circuit with the pulse-shaping feature will lend itself as a driving source to electromagnetic and electrical type of marking units where either a one-way thrust on the related marking element results from the amplifier output current or when a two-way thrust on the related marking element results from the output current or voltage. Thus when all four transistors A, B, C and D are operated in nearly balanced adjustment with respect to zero input signal for zero output, as input signal is later applied the output current or potential can be made to reverse in direction on input signal reversal from build-up to collapse and thereby effect an equal forward acceleration or thrust, to advance the marking element to mark, and then to reverse the acceleration or thrust to retract the marking element. Conversely, if the upper two transistors, A and B for example, are biassed considerably beyond cutoff with respect to input signal or substantially removed from amplifier action then the lower two transistors C and D can be operated to give a unidirectional current or potential in the output in conformity with the input marking signal build-up and collapse or reversal. This one-way type output drive may be applied to a type of marking unit having an electromagnetic or electrical type of forward thrust means for the marking element but operating against a mechanical spring means, for example, to obtain reverse thrust or retractive action to the marking element. With one-way type output the circuit may be adjusted to produce a minimum average dissipation in the marking units as a load in view of speed and duty cycle of operation thereof. This adjustment for unidirectional type output from the amplifier normally consists of setting the operating bias on the active transistors C and D for class B or alternatively class C operation by proper choice of values for resistors 69, 68 and 67, while transistors A and B are effectively or actually removed from the circuit operation. It is to be noted that with this type of circuit used as a marking unit driving source the marking unit driving coil or equivalent marking element driving means therein need not have a split winding, divided section or the like to provide bi-directional marking element thrust, if desired, and thus the marking element driving or thrust means can be made simpler and more efficient.

Referring to FIGS. 6 and 7, there is shown an electromagnetic type marking unit 77 operating in conjunction with a magnetic structure having magnetic gaps $N_1$–$S_2$ and $S_1$–$N_2$ extended a distance and direction corresponding to the length and position of the recording line on record sheet 20. Sheet 20 is fed over drum 22 with its helix ridge 21 in a manner as previously described and the recording line thereon is defined as previously. Carrying tape 17′ passes through and is supported by guide channels 75 and 76 which extend and are supported in the apparatus frame in a manner similar to guide channels 18 and 19 of previous figures such that tape 17′ is guided in a path substantially parallel to the recording line. Tape 17′ is an endless type and is carried and driven in a manner similar to tape 17 except that it is oriented in the apparatus edgewise to the recording line during the recording interval of the successive marking units 77 carried thereon. A set or series of marking units 77 are mounted at substantially equally spaced intervals along the length of tape 17′ when used in facsimile recording apparatus. Each marking unit 77 consists of a thin, flat, semi-rigid, insulated card of somewhat square or rectangular face area with a protruding portion along the lower side on which is mounted a marking pen or plunger 90 which is carried adjacent to and directed toward the recording line during a recording interval. Each card has imbedded or printed on either or both faces thereof a continuous electrical coil 78 of square pancake form. The winding of this thrust coil 78 is formed by starting at an inside terminal 86 and progressing in one direction (counterclockwise) with approximately square sides of increasing dimension until the card edge is nearly reached, whereupon the outer turn is crossed over the winding and brought to a second terminal 85 near the card center. Terminal 85 is arranged as a brush contact for external circuit connection by sliding contact with a mating commutator strip 84 which extends substantially parallel to the path of movement of the marking unit 77 during a recording interval. Each turn of the winding is insulated from all others and the coil is also insulated or protected from electrical contact with the carrying tape 17′ on the side facing thereto, over which surface its slides during marking activation. The driving or thrust coil 78 is constructed of a conductor size and number of turns to correspond to the activating signal driving source to be connected thereto, such as the marking amplifier of FIG. 5, and to which it responds. Marking unit 77 is slidably held on tape 17′ by the semirigid guide flanges 87 on either side thereof which are attached crosswise on the tape and are formed with upper and lower closed ends to limit the vertical sliding movement of unit 77 during marking activation. Flanges 87 are fitted more closely along the right and left sides or edges of marking unit 77, with only slight clearance to prevent appreciable side-to-side movement of unit 77 in the direction of travel of tape 17′ but within the holding flanges 87. Flanges 87 are preferably of electrical insulating material and are proportioned and mounted on tape 17′ to avoid interference with guide channels 75 and 76 as the marking units pass therethrough. In the closed ends of flanges 87 is fixed a set of small thrust take-up or damping pads 94 which are employed to eliminate movement bounce or chatter of the marking unit 77 as it may be thrust back and forth vertically during marking activation (and retraction).

Two channel-type or U-form magnets 81 and 82 are extended substantially parallel to the recording line for at least the length thereof and are fixedly supported in the apparatus frame, such as by frame members 79 and 80, in a manner to provide the two fixed magnetic gaps $N_1$–$S_2$ and $S_1$–$N_2$ so disposed as to permt tape 17′ to pass therethrough while carrying the marking units 77 in succession. As the marking units pass through, the upper and lower sides of the coils 78 are caused to pass adjacent the magnet pole faces, substantially as shown, with the marking element or pen 90 passing adjacent to and directed toward the recording line. A strong fixed magnetic field is produced across the gaps, in a sense indicated by the pole designations (or the opposite thereof), by the magnetic excitation coils 83 and 83′, normally connected in series aiding, to which is connected a D.C. power source, through leads not shown. The marking element or pen 90, of ink-writing type here, carries thereon an ink pick-up or wiper pad 91 which is made to register with the ends of an ink supply duct 92, formed in member 93 and frame member 79 and which feeds ink from the ink well 33, during a portion of the traverse of the pen 90 in its total path. A support bar 88 is provided lengthwise through the magnetic structure and adjacent to tape 17; on the side thereof opposite to that where the marking units 77 are carried, and is held firmly in the apparatus frame by means not shown, to provide stability to the marking units during their respective recording intervals. The coil terminal 86 may be connected to tape 17′, if the tape be electrically conductive, by a short flexible pigtail conductor, not shown, to maintain an external circuit or ground connection while permitting free vertical movement of marking unit 77 on tape 17′ during marking activation. Tape 17′ shall then have sliding electrical contact with guide channel 75, which is also electrically conductive in this case. Thus conductor leads indicated as 89 and 89′ may provide external electrical connection from the successive marking unit driving coils 78 to a signal power driving source.

Guide channels 75 and 76 are formed and supported to fit closely, that is with little sliding clearance, around the edges of tape 17′, and are provided with relatively high flexural strength so that as the marking unit 77 with its thrust coil 78 is signal-activated for marking, substantially a full thrust movement will be effected on the marking unit to slide in the guide flanges 87 and thereby positively move the marking element 90 toward or away from the recording line, and very little sidewise movement or reaction will be effected on tapes 17′. Channels 75 and 76 constitute a sliding bearing for the tape and may be suitably lubricated, if desired.

It will be seen that as the marking unit 77 passes through the magnetic gaps $N_1$–$S_2$ and $S_1$–$N_2$ in proper orientation and as marking signal power is applied to the coil terminals 85 and 86, the signal current in the coil 78 will react to the magnetic field in the gaps, due to motor action, and produce in the horizontal coil conductor portions (FIG. 6) a substantially vertical thrust, either upward or downward according to the current and field directions or sense. The vertical coil conductor portions (FIG. 6) or vertical components thereof which obtain in the strong magnetic field regions during the marking interval should be substantially balanced in effective length therein, and the field extended sufficiently beyond the marking interval, as for example, an extension of a half marking unit width beyond, to minimize diverse marking unit thrusts or torsion, other than the desired principal vertical thrust crosswise to tape 17′. Thus the marking element or pen 90 will be advanced and retracted to alternately engage and move away from the record sheet 20 in conformity with the applied marking signals.

Alternatively, inverse electrical operation may be applied to marking unit 77 and the field produced by magnets 81 and 82 wherein a fixed direct current may be applied to the marking unit at terminals 85 and 86 and the variable marking signal impulses applied to the magnetic excitation coils 83 and 83′ to achieve equivalent graphic recording as described above. In this case the magnetic structure including magnetic elements 81 and 82 may be composed of laminated portions or subdivided particles to minimize power losses due to rapid excitation changes. Similarly, the excitation coils 83 and 83′ may be modified to better match the associated signal power driving source. It will be seen that an alternating or intermittently reversing magnetic field across the magnetic gaps, $N_1$–$S_2$ and $S_1$–$N_2$ as designated for a fixed direct field, will produce a corresponding alternating or intermittently reversing thrust on the marking unit 77 during a recording interval.

Where tape 17′ is of electrically non-conductive material, or if otherwise desired, coil terminal 86 may comprise a contact brush and may be caused to make sliding electrical contact with a second commutator bar or strip, not shown, in similar manner to brush contact 85 and strip 84, to provide a return or ground electrical path for the thrust coil 78 during a marking interval.

Referring to FIG. 8, an alternate type of marking unit means is shown wherein a piezoelectric crystal 120 is mounted on an endless type carrying tape 121 by the two upper clamp-type electrodes 124 and 125 which are affixed to the tape. Electrode 125 is connected electrically to the tape whereas electrode 124 has an insulated through bushing and contact brush to provide an insulated crystal electrode with respect to the tape if it be of electrically conductive material. Electrodes 124 and 125 make an appreciable surface area contact on opposite sides of the crystal at its upper end, the crystal being of appreciable thickness but having a vertical length several times its thickness and its width. Tape 121 is carried edgewise past a recording line by the channel guides 122 and 123 in conjunction with associated driving means as previously described. At the lower end of crystal 120 there is attached a clamp or clevis 126 which extends slightly to the right and connects by a pin joint at 127 to an L-shaped driving link or lever 128 which pivots at its apex or bend on an upright pin 130. Pivot pin 130 is fixed to and stands up on the tape 121. Lever 128 connects to and drives the marking element 129, which may be a plunger or marking pen, in a short and generally vertical stroke as the lever is caused to pivot in a small arc about pin 130. A lower guide bracket 135 is provided at the lower end of crystal 120 to permit this end of the crystal with the clevis 126 to slide laterally thereunder when the crystal is excited, while retaining the crystal relatively close to the tape surface. Bracket 135 is fixed to tape 121 by a rivet, or similar means, at 136. Marking element 129 is provided with one or more vertical guide clamps 137 which are affixed to tape 121 and provide a journalling of the tubular or rod-like marking element 129 such that the element is constrained to move substantially only vertically. Marking element, when comprising an ink-type pen or the like, has provided thereon an ink wiper pad 131 which is made to register with an ink supply duct or channel 132, shown schematically behind tape 121.

Brush-type electrode terminal 124 is disposed so that its contact brush is caused to register with an electrical commutator strip 133 during a recording interval. Tape 121 provides sliding electrical contact with one of its guide channels 123. Electrical leads 134 and 134′ are brought out from strip 133 and channel 123 to enable exciting potential to be applied to electrodes 124 and 125. The crystal is substantially clamped to the tape at its upper end and free to distort or shift laterally (along the tape) at its lower end. Thus, when excitation potential is applied to or between electrodes 124 and 125, by an external marking signal driving source for example, the lower end of crystal 120 will shift laterally in accordance therewith and will move lever 128 in corresponding arcuate shift about pin 130. The horizontal arm section of lever 128 is several times the length of the vertical arm section from pin joint 127 to pivot pin 130 so that the lateral movement of clevis 126 is effected as a multiplied movement or stroke vertically of marking element or pen 129. With this vertical stroke pen 129 is caused to advance and alternately retract from a recording line on a record sheet or recording medium and thereby effect graphic recording in accordance with the graphic recording signals applied as excitation potentials to the marking unit.

An alternate form of the marking unit of FIG. 8 consists of mounting a magnetostrictive rod, such as a long and narrow nickel rod, crosswise to tape 121 with a single mounting clamp or bracket rigidly fixed to the tape and also to but one end of the rod. The other rod end is provided with a guide sleeve or guide clamp, such as clamp 137, which is attached to the tape but will permit the rod to elongate and contract lengthwise when it is excited magnetically. An excitation coil is provided around the central portion of the rod with the winding end leads connected respectively to terminals 124 and 125. The tape 121 must then be of magnetic material to complete the magnetic path upon rod excitation. The marking element driving lever 128 may then be of substantially straight form with a pivot at pin 130 arranged much closer to the lever end associated with the magnetostrictive rod than to the lever end which attaches to the marking element 129. The first lever end of lever 128 is attached semi-rigidly to the rod end, which passes through the guide clamp, to be driven thereby and follow the elongations and contractions of the rod lengthwise. If, then the magnetostrictive rod is magnetically excited or driven by means of an external marking signal amplifier, or the like, being connected during a recording interval to the excitation coil associated therewith graphic recording may be effected upon a recording medium in accordance with the respective marking signals applied. In this case the movement multiplication ratio of rod elongation to marking element vertical stroke, achieved by the driving lever 128, or equivalent members, must be of the order of many times, such as perhaps one hundredfold or more, to produce satisfactory recording results.

Referring to FIG. 9, there is shown constructional details of an electromagnetic type marking unit with provision for direct ink marking upon a dry and relatively smooth recording medium. Magnetic shell 96 contains a central magnetic core 98 and an operating coil 99 which upon being electrically energized pulls in (down) the thrust armature 97. Armature 97 is of a stiff circular spring type to which is attached the centrally located marking pen shank 52. The pen shank is of a hollow tubular form which is filled with a suitable packing or filler material 101 possessing absorptive or capillary characteristics with respect to a marking fluid or writing ink supplied to it at the upper shank end such that it will lead this ink or fluid at a proper rate through the shank to the rotatable ball point type tip 100 at the lower shank end. With this filler material the ink absorbed therein is substantially prevented from shaking about or leaking out while the pen shank may be in rapid endwise motion during its marking function. An ink pick-up or wiper pad 55, mounted in the marking unit cover 102, supplies ink to the filler material upon contact therewith during a portion of the stroke of the pen shank. The thrust armature together with the marking pen assembly, which includes the shank, tip, filler material and the ink contained therein, are normally constructed of very small total mass in order to permit rapid operation thereof for high speed marking while requiring but a moderate driving or activating signal energy applied to the coil 99. The electrical contact brush assembly 50 is disposed in suitable location on the shell 96 to enable application of graphic marking signals to the operating coil through sliding contact of the brush with a mating commutator strip in the apparatus during the marking interval. One end of the coil winding is connected to brush 50 whereas the other end of the winding is connected to shell 96 at the point designated S. The marking unit is mounted to tape 17 through mount pins 57 which are imbedded in opposite sides of shell 96 and are brazed or soldered to the tape along a narrow line. Electrical connection is thus made from the shell to the tape. Tape 17 has sliding electrical contact with the apparatus guide channels and frame, as at 50′, to complete the return or ground circuit connection for coil 99, the coil being otherwise insulated from the shell and central core.

The downward thrust of the pen tip 100 into contact with the record sheet enables deposition of the marking fluid or ink on the sheet by the ink-wetted ball point tip in rolling contact therewith. It is preferable, in the fluid marking type recording apparatus, that a starting marking strip of separate recording material be provided at the starting end of the recording interval and superimposed over the edge of the actual record sheet in a manner such that the pen tip, be it ball point type or other, will definitely contact this strip for a short recording stroke distance before commencing the actual recording line on the record sheet. This may be arranged either with or without signal activation of the marking unit for the starting strip interval. However, such provision will tend to insure that the pen tip will be wetted with marking ink just prior to entering the actual recording line on the record sheet. After marking signal is removed from coil 99, armature 97 retracts the pen 52 upward due to its return spring action. For the downward thrust action a damping pad or ring 95 is fixed between armature 97 and core 98 to minimize pen shock or vibration after abrupt armature pull-in and provide more stable marking conditions with respect to the contact of pen 52 with its tip 100 engaged on the record sheet. For the upward thrust or retraction action, wiper pad 55 comes into contact with the upper pen shank end and the upper face of armature 97 to provide a damping and stabilizing effect to the pen assembly.

Referring to FIG. 10, a marking unit body 103 is carried during its marking interval through the extended guide 113 on a set of lower rollers or wheels 104 which mount and turn on shaft pins 105. Pins 105 are imbedded at one end thereof on opposite sides of body 103 and protrude substantially horizontally. Body 103 is mounted to endless carrying tape 17 by means of mount pins 57 in a manner similar to that specified for the marking unit of FIG. 9, and holds a marking plunger 106 which is slidable vertically therein. Plunger 106 contains a forked upper end in which is mounted an upper or driving roller wheel 114 on a through shaft pin 115 held crosswise in the forked end. An extended pressure bar or inverted pressure channel 111, of length similar to that of the recording line and which is actuated by external mechanical energy means, not shown, pushes the marking plunger 106 downward into pressure contact with a multi-colored marking ribbon 110 upon signal activation of the channel 111. Ribbon 110, shown in section, is held by ribbon guide 116 immediately over and adjacent to the recording line on record sheet 20. The downward thrust of the marking plunger results by engagement of channel 111, which is activated downward uniformly along its length by appropriate marking signal driving means, not shown, with the driving wheel 114 during a recording interval as the marking unit is carried by tape 17 through guide channel 113 adjacent to the recording line. The thrust by channel 111 to plunger 106 is applied against the return force of the bowed spring washer 112 placed between the body 103 and the forked end of the plunger. The upper and lower roller wheels are disposed to travel smoothly through the recesses in the guide channels 113 and the actuator channel 111 to provide stable marking conditions with a minimum of frictional drag with respect to the marking unit while passing through guide 113 under the carrying force of tape 17.

The marking ribbon 110 contains three separate color bands 107, 108 and 109, each of similar form but of different marking color, lengthwise thereon for a distance greater than the length of the recording line and is fed endwise by appropriate means, not shown, through guide 116 in a direction making a small angle with the recording line in order to present fresh marking area thereon to successive marking plungers. Ribbon 110 has enlarged edge ridges 117 to permit a slidable grip thereof by the opposing side members of the ribbon guide 116. A rigid backing rod or blade 118 is supported beneath the record sheet along the recording line, against which the plunger pressure is applied through the ribbon 110 and through record sheet 20 during recording. Rod 118 is in substitution for the rotatable helix drum 22 described previously, and may have a small radius of curvature in order to deform the record sheet sharply away from the recording line, along the sides thereof, to enhance marking definition. The ribbon 110 and ribbon guide 116 are moved sidewise with respect to the recording line, as indicated by the motion arrow, by external signal controlled means, in conformity with appropriate marking color signals that may be received by the apparatus. This ribbon shift is made in suitable increments to present a particular one of the color bands 107, 108 and 109 to respective ones of the successive marking units as they are carried past the recording line. The ribbon sideshift is normally made in synchronism with the derivation of corresponding graphic color information which may obtain in an associated scanning apparatus or transmitting apparatus in the system, and thus effect a multi-colored graphic recording in a predetermined manner. The marking colors contained on ribbon 110 may be provided by impregnating a fabric or cloth strip or the like with suitable marking fluid, pigment or ink of proper color, such as with a typewriter ribbon, or by coating a fabric or tough paper with a transfer film of the necessary colors, or by equivalent means, whereby the colored marking material may be transferred from the ribbon to the record sheet by the pressure of a marking plunger, such as plunger 106, to deform the ribbon over a small area into contact with the record sheet and effect deposit of a defined amount and area of marking material onto the sheet.

In one mode of apparatus operation, the marking band color shift may be effected just prior to the beginning of the stroke or sweep of each marking unit over the recording line in conformity with a received color signal in the apparatus. In another operation mode, the shift to the various color bands 107, 108 and 109 may be effected periodically or momentarily during the recording sweeps of the various marking units along the recording line, depending upon the type of recorded effects desired. Obviously, for single color recording the marking ribbon 110, or similar marking medium, will contain only one color of marking material to be transferred to the record sheet and the means for sidewise shift of the ribbon and ribbon guide may be omitted. Also, it is obvious that a marking plunger may be employed to replace the ink-marking pens described with reference to other types of marking units disclosed herein, with the provision of a corresponding marking ribbon, transfer sheet or the like disposed between the plunger tip and the record medium during the marking interval.

Referring to FIG. 11, a further type of electromagnetically operated marking unit is shown, which unit combines some of the features of previous figures. The marking unit, shown in section, may be one of a series of like units carried in regular succession along an endless tape 143 in a manner as described with respect to previous figures. The marking unit 140 includes an outer cylindrical magnetic shell 141 which is mounted to a non-magnetic base ring 142 by attaching side pins 146. Base ring 142 in turn is fixedly mounted to carrying tape 143 along a narrow line crosswise thereto by brazing, soldering or the like as indicated at 144. Tape 143 is non-magnetic but is electrically conductive preferably, and passes through guide channels 145 in a path adjacent to the recording line of a record medium or sheet. Stabilizer leaves 147 may be applied at the sides of base ring 142 in a direction lengthwise to tape 143 to provide stability to the marking unit during a marking interval. Within shell 141 is a central magnetic core of cylindrical form with an upper portion having a lesser diameter than the lower portion which extends near the mouth of the shell. This central core 150 is mounted to shell 141 by flanged bushing 151 passing through the upper center of the shell and through which a small ink supply duct 148 passes vertically. In the annular region between the upper or reduced diameter portion of core 150 and the shell 141 there is placed an electrical exciting coil 149 wound as a multilayer solenoid around the smaller core portion. Coil 149 has its outer terminal connected to a contact brush 152 from whence an external circuit connection, as indicated by lead 153, may be had through a commutator strip in the apparatus as previously described. The inner terminal of coil 149 is connected to shell 141, as indicated at $G_1$, to provide a ground or return circuit connection through shell 141 to base ring 142 and thence to tape 143 and by sliding electrical contact therewith to a guide channel 145 which may constitute a frame ground connection for the apparatus, as at 161. Coil 149 is normally energized from a D.C. source applied from lead 153 to ground to provide a fixed magnetic excitation to the magnetic structure and thereby produce across the narrow annular gap 154 at the structure portion between the larger diameter portion of core 150 and the inner surface of shell 141 a strong fixed radial magnetic field. In the annular gap 154 is placed a thin cylindrical coil 155 rigid in form and supported in the gap by upper flexible washer 157 and the lower spider 158 such that the coil does not touch the shell or the core but may move a short distance vertically in the gap. Coil 155 has its one terminal connected to brush assembly 156 which is disposed to make sliding contact with a second commutator strip in the apparatus during a recording interval, as indicated by lead 160, while the second terminal of coil 155 is connected to core 150, as indicated at $G_2$, to achieve a ground circuit return path therefor, since core 150 is connected to shell 141 by its mounting thereto.

Mounted centrally on spider washer 158 and directed vertically downward is the marking pen 162 which extends upward into a recess 163 of core 150 and protrudes downwards below the guide channels 145 to approach the recording line. Pen 162 includes a ball point type of tip 164 and contains a filler material 165 centrally through it to connect with the feed duct 148, which also passes centrally through core 150, and control the ink supply fed to the tip. A damping washer 166 of felt, polyurethane or the like is placed around pen 162 in the recess 163 to stabilize the pen as it may be thrust rapidly back and forth (up and down) during marking actuation. Pen 162 also passes with small clearance through the lower central protruding portion of base ring 142 which portion acts as a guide to the pen. Duct 148 terminates at its upper end in the ink pick-up or wiper pad 167 which is caused to register with an ink supply channel in the apparatus, as previously described, to gain a periodic supply of marking ink or fluid for the pen. It is preferable that this ink supply channel in the apparatus maintain registration with pad 167, and possibly also the top face of bushing 151, during the entire recording interval of the marking unit 140 to effect a stability to the unit, in conjunction with the sliding contact of tape 143 with guide channels 145, during recording.

Graphic recording signals are applied to coil 155 through the second comutator strip or lead 160, with ground path return, whereupon coil 155 effects motor reaction in the gap 154, due to its signal currents, and produces a corresponding vertical thrust to pen 162, both upward and downward in conformity with the sense of the magnetic field in gap 154 and as the coil current reverses with the applied signal. Thus marking pen 162 is caused to advance downward in contact with the record sheet in accordance with a positive or mark type of recording signal and then is caused to retract upward away from the record sheet in accordance with a negative, collapse or no-mark type of recording signal to effect a desired type of graphic recording. It will be noted that this type of magnetic structure and element actuation means resembles that in certain types of transducers where a very high rate of element response is often obtained, sometimes of the order of several thousand cycles per second, and therefore the construction should lend itself to high speed recording operation. A shock pad or washer of damping material, pad 168, is placed between spider washer 158 and base ring 142 to reduce pen bounce or chatter for high speed operation.

It will be noted from the above that the marking amplifier means of FIG. 5 is applicable as a driving signal source to the marking units modifications according to FIGS. 6, and 7, 8 and 11 in particular where a bi-directional type of output current or potential is desired for marking unit activation and thereby secure a corresponding bi-direction thrust for the marking element. In such case, the circuit means of FIG. 5 would normally employ the four transistors substantially as shown to gain the advantages from the circuit means as stated earlier. On the other hand, the marking unit modification of FIG. 9 may well use the modified arrangement of the circuit means of FIG. 5 wherein the output current to the load is caused to be substantially unidirectional, since armature 97 will pull in to core 98 with either direction of current through coil 99 therein.

It is to be understood that where ink-type marking units are employed in the invention apparatus, the marking ink may be of the well-known Hectograph type such that the resulting graphic recordings may be duplicated by the Hectograph duplicating process, or a Ditto process, if desired. Of course, where the record sheet used is of of translucent or transparent character, and opaque type ink is used in the recording process, the resultant recording may be duplicated by blueprinting, Ozalid or similar processes where light transmission through the record sheet is applicable to the duplication.

It will be evident to those skilled in the art that many modifications of the elements and means disclosed herein may be made in accordance with the principles described. All such modifications pertaining to the graphic recording methods and apparatus described herein are to be considered within the scope and spirit of the invention except as limited by the hereinafter appended claims.

What is claimed is:

1. Continuous-type recording apparatus for graphically recording on a record medium in response to received electrical marking signals, comprising marking means including at least one marking element having a marking end, means for supplying a quantity of liquid marking material to said element for application of said material to said record medium by said marking end, means for supporting said record medium at a recording line which extends transversely substantially across said medium, means including motor means for progressively advancing said record medium past a said recording line, means operating automatically and independently of the received electrical signals for periodically linearly sweeping said marking end of said element along said recording line in spaced relation with respect to said line and said medium, and means responsive to said received marking signals during at least certain of said periodic sweeps for advancing the marking end of said element into physical engagement with said record medium along said line to mark said medium and for subsequently withdrawing said marking end from physical engagement with said record medium and from contact with said medium to cease marking said medium.

2. Apparatus for graphically recording on an elongated record medium in response to received electrical marking signals, comprising.

means for progressively feeding said record medium along the direction of its length past a recording line which is transverse to said medium, means for supporting said medium at said line, marking means including a series of similar marking units, each said unit having a marking element with a marking tip, sweeping means including an endless conveying device having said marking units carried thereon at substantially equally spaced intervals lengthwise of said device for repetitively sweeping said marking units along said recording line in spaced relation with respect to said line and said medium, said intervals corresponding substantially to the length of said recording line, means for supplying a quantity of liquid marking material to each of said marking units for application of said material to said record medium by the respective marking tip, means for applying said received marking signals to actuate each of said marking units during the respective sweep thereof along said line to advance the respective marking tip into marking engagement with said record medium, and means for subsequently withdrawing said marking tip from marking engagement with said record medium and from contact with said medium.

3. Apparatus according to claim 2 wherein said supporting means for said record medium includes means for imparting to said medium along side line a relatively sharp curvature which is convex upward toward said marking tip at said line to provide a small defined area of marking engagement by said tip on said medium for relatively sharp marking definition.

4. Apparatus according to claim 3 including a rotatable cylinder and wherein said supporting means comprises a raised ridge element of helical form for location underneath said medium at said line and disposed around said cylinder for an axial distance substantially equal to the length of said line, and means for rotating said cylinder in synchronism with the respective sweeps of each of said marking units along said line to impart to said medium an area of deformation convex toward each of said marking tips during their respective sweeps along said line and produce a sharply defined area of marking engagement of each of said tips with said medium.

5. Apparatus according to claim 2 wherein said marking units each comprise an electromagnetic assembly which includes said marking element, said assembly having a magnetic circuit which includes an outer magnetic shell-like housing, an inner core member mounted in said housing and having a hole therethrough for guiding said marking element, and an armature resiliently supported by said housing and slightly spaced from said core member to define a magnetic gap therebetween, said armature being secured to said element to hold said marking tip of said element normally out of contact with said medium, excitation coil means inside said housing for said magnetic circuit and adapted for energization by said applied marking signals to establish magnetic flux in said circuit and across said gap to attract said armature in opposition to said resilient support and advance said marking tip into marking engagement with said medium.

6. Apparatus according to claim 2 wherein each of said marking units comprises an electromagnetic assembly which includes said marking element, said assembly having a shell-like magnetic housing which has a uniform inner face portion extending axially thereof from its open end for a portion of its depth, a magnetic core member mounted inside said housing and having a cylindrical end portion in juxtaposition to said inner face portion to define a magnetic gap therebetween of generally annular form, said core member also having a portion of reduced transverse dimension with respect to said end portion, excitation coil means wound on said portion of reduced transverse dimension and adapted for connection to a direct current source to establish magnetic flux of substantially constant magnitude across said gap, annular thrust coil means supported for only axial movement in said gap, said thrust coil means being mechanically coupled to said marking element to control the position of said element, said thrust coil means being adapted for energization by said applied marking signals to give reactive thrust due to motor action in said gap to produce said advancement and said subsequent withdrawal of said marking tip respectively into and out of said marking engagement with said record medium.

7. Apparatus according to claim 2 wherein said conveying device is nonmagnetic and wherein each of said marking units comprises a thrust assembly which includes said marking element, means for defining a pair of magnetic gaps which are extended in spaced relation with respect to said recording line for at least the full length of said line, said thrust assembly including a relatively flat card member of electrically insulating material and slidably supported on said conveying device, said card member containing a flat continuous electrical coil with end terminals adapted to receive said applied marking signals, said assembly being adapted to be carried by said conveying device between said pair of gaps during the respective sweep of said assembly along said line, excitation coil means adapted for connection to a direct current source to produce in said pair of gaps a strong magnetic flux of predetermined fixed direction, electrical commutator means adapted to apply said marking signals to said terminals of said flat coil during the respective sweep of said assembly along said line to produce motor action in said gaps and to thrust said card member and said marking element in directions to advance said respective marking tip into marking engagement with said record medium and to subsequently withdraw said marking tip from marking engagement with said medium.

8. Apparatus according to claim 2 wherein said conveying device is electrically conductive and wherein each of said marking units comprises an electrically-excited driving assembly which includes said marking element, said driving assembly including a piezoelectric crystal of elongated form positioned substantially crosswise to said device, said crystal being fixedly supported on said device between two electrodes at one end of said crystal, said driving assembly having means for coupling the other end of said crystal to said marking element, and means including electrical commutator means for connection of said marking signals to said electrodes to produce piezoelectric excitation of said crystal and corresponding deflection of said other end to drive said marking element in directions to advance said respective marking tip into marking engagement with said record medium and to subsequently retract said marking tip from marking engagement with said medium.

9. Apparatus for graphically recording in multiple color on an elongated record medium in response to received electrical marking signals, comprising means for progressively advancing said medium along the direction of its length past a transverse recording line, marking means including a first marking unit which has a first marking element having a first marking end and which has first electromagnetic actuator means for moving said first end with respect to said medium, said marking means including a second marking unit which has a second marking element having a second marking end and which has second electromagnetic actuator means for moving said second end with respect to said medium, sweeping means including endless conveying means carrying said units thereon with predetermined spacing therebetween for sweeping said first marking end along said line normally in spaced relation with respect to said line and said medium and for sweeping said second marking end substantially along said line normally in spaced relation with respect to said medium, means for supplying a quantity of a first marking liquid of a first color to said first element for application to said medium by said first marking end when in marking engagement therewith, means for supplying a quantity of a second marking liquid of a second color to said second element for application to said medium by said second marking end when in marking engagement therewith, means including means for applying to said first actuator means said received signals corresponding to said first color for advancing said first end into engagement with said medium to mark said medium with said first color during at least certain of said periodic sweeps of said first end and for subsequently withdrawing said first end completely from engagement with said medium to discontinue marking said medium with said first color, and means including means for applying to said second actuator means said received signals corresponding to said second color for advancing said second end into engagement with said medium to mark said medium with said second color during at least certain of said periodic sweeps of said second end and for subsequently withdrawing said second end completely from engagement with said medium to discontinue marking said medium with said second color.

10. In graphic recording apparatus, marking amplifier means comprising first and second amplifier stages including a group of two NPN type transistors and two PNP type transistors connected in a compound complementary symmetry circuit, the two halves of said circuit being adapted for connection respectively to separate D.C. supply sources, electrical commutation means in the signal output connection of said circuit adapted to supply output signals to a plurality of marking units, resistance means including a group of at least three resistors adapted to determine operating bias and signal output balance on the amplifier stages of said circuit, an input terminal to said circuit and a pulse-shaping network connected between said input terminal and the driving point of said first stage and adapted to provide a predetermined decay for applied input signal pulses to said first stage, whereby the output of said amplifier means can comprise power signal pulses of bidirectional current character and of predetermined peak to steady value with respect to applied input signals to said amplifier means.

References Cited by the Examiner

UNITED STATES PATENTS

| | | | |
|---|---|---|---|
| 2,212,970 | 8/1940 | Finch | 346—35 |
| 2,376,888 | 5/1945 | Wise | 346—141 X |
| 2,785,039 | 3/1957 | Artzt | 346—101 |
| 2,847,519 | 8/1958 | Aronson | 330—17 X |
| 2,891,107 | 6/1959 | Weingart et al. | 346—140 X |
| 2,951,894 | 9/1960 | Hirsch | 178—5.2 |
| 3,032,764 | 5/1962 | Bell | 346—140 X |
| 3,149,902 | 9/1964 | Dransfield | 346—105 |
| 3,167,379 | 1/1965 | Grafstein | 346—79 |

LOUIS J. CAPOZI, *Primary Examiner.*

LEO SMILOW, *Examiner.*

J. W. HARTARY, *Assistant Examiner.*